June 24, 1930.  W. J. LILLY  1,766,180
BOOK MATCH MACHINERY
Filed Nov. 14, 1927  3 Sheets-Sheet 3
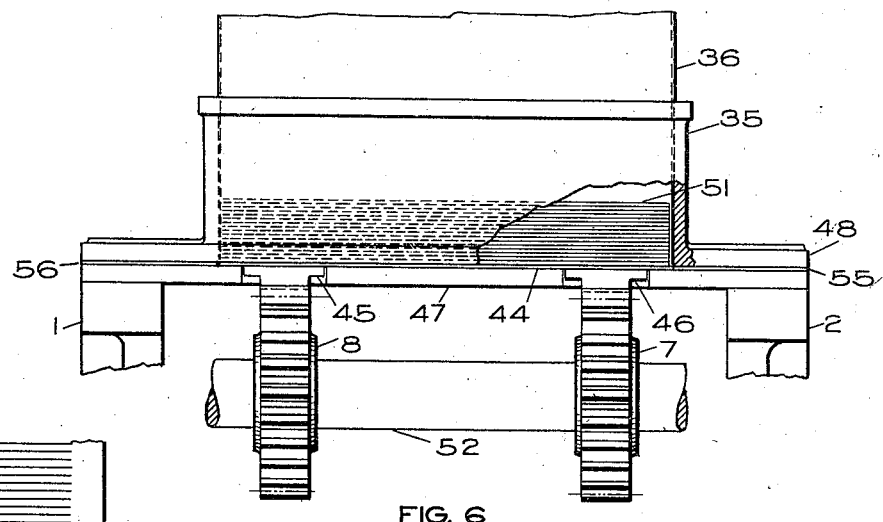
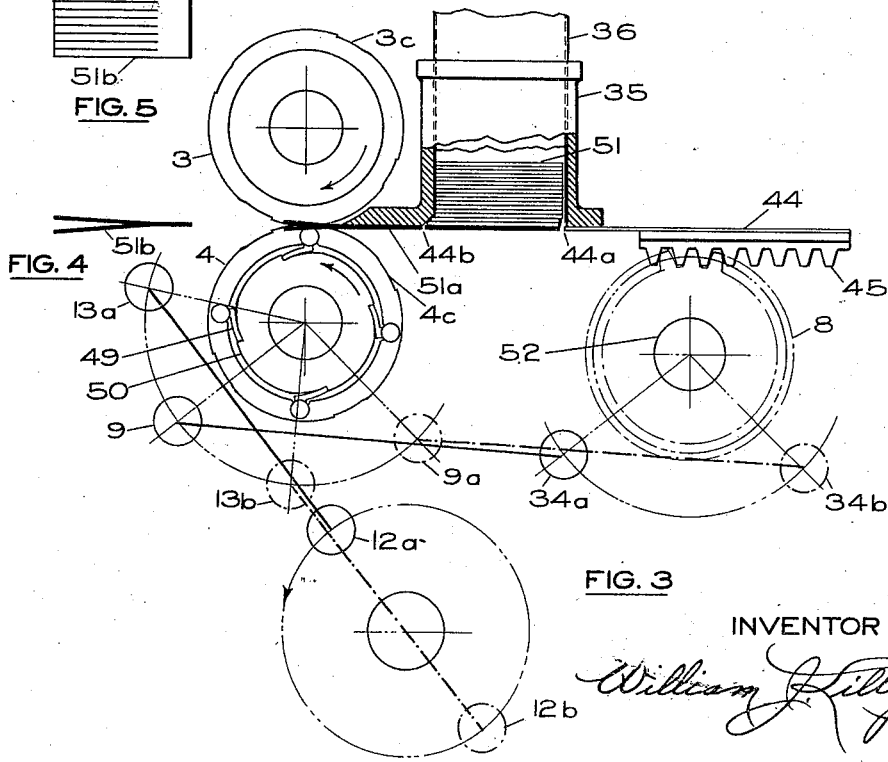
INVENTOR
William J. Lilly Patented June 24, 1930

1,766,180

UNITED STATES PATENT OFFICE

WILLIAM J. LILLY, OF TACOMA, WASHINGTON, ASSIGNOR TO H. A. SUTLIFFE, OF TACOMA, WASHINGTON

BOOK-MATCH MACHINERY

Application filed November 14, 1927. Serial No. 233,257.

My invention relates to improvements in machinery for the manufacture of book matches, and the objects of my improvements are to provide more efficient and more economical means of producing book matches.

I attain these objects by means of the improvements illustrated in the accompanying drawings, in which Fig. 1 is a side elevation of the match machine.

Fig. 3 is a diagrammatical, semi-sectional side view of the cutters, cranks, gearing, hopper and feed mechanism of Fig. 1 and Fig. 2.

Fig. 4 is an end view of the match material after being passed through the cutters of the said match machine.

Fig. 5 represents a plan view of Fig. 4.

Fig. 6 illustrates a rear view of Fig. 3.

Similar numerals refer to similar parts throughout the various views.

Figure 1:
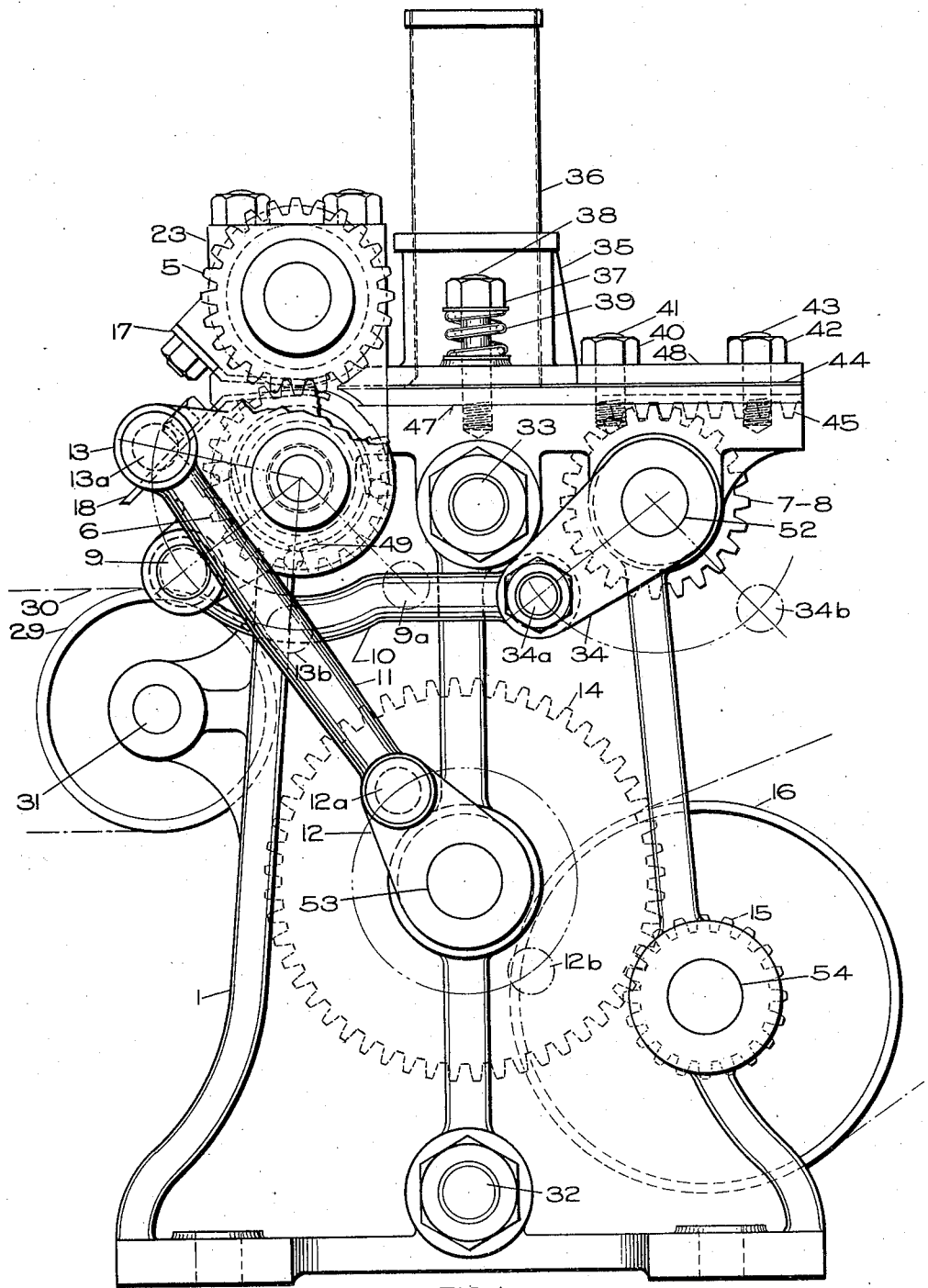
Figure 2:
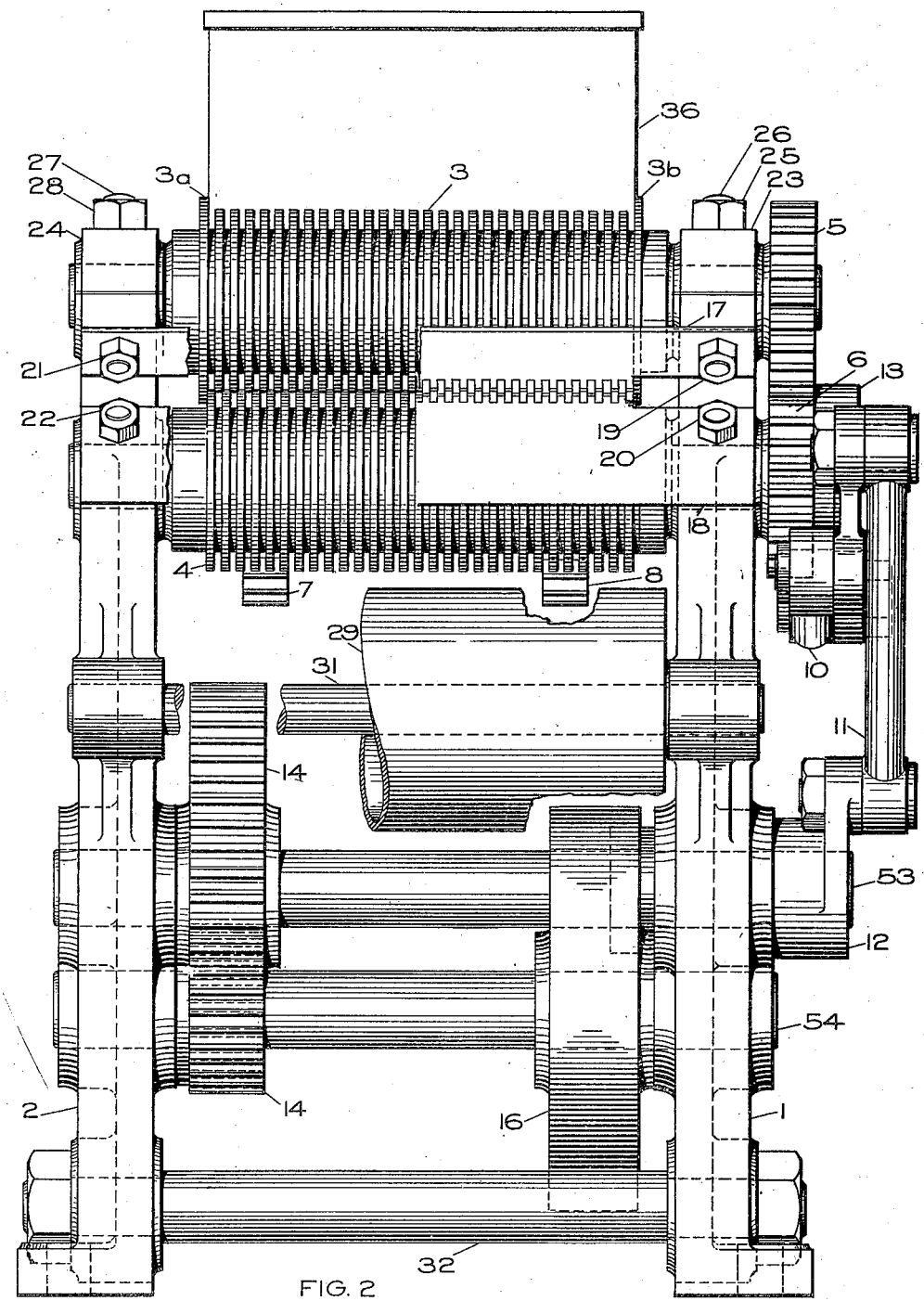
Fig. 2 is a front elevation of Fig. 1.

The frame of the match machine is composed of sides 1 and 2, which are held together by means of the tie rods shown at 32 and 33.

At 3 and 4 are shown the cutters for slitting the match material for matches, as shown in Fig. 4 and Fig. 5. The said cutters, 3 and 4, are composed of multiple, circular knives, that are rotatably mounted in the double bearings 23 and 24.

The gears for rotating the said cutters 3 and 4 are shown at 5 and 6.

The gears for operating the feed mechanism are shown at 7 and 8, which are securely mounted on the shaft shown at 52.

A crank pin is shown at 9, which is attached to a double crank represented by 13.

A connecting rod is shown at 10, which is connected to pin 9 at one end and to pin 34$^a$ at the other end.

Connecting rod 11 forms a connection between pins 13$^a$ and 12$^a$.

A crank is shown at 12, on the end of which is mounted a crank pin 12$^a$.

A double crank and ratchet case is shown at 13.

Gear 14 is mounted on shaft 53 and is rotatably driven by means of pinion 15, which is mounted on shaft 54.

On shaft 54 is also mounted a pulley shown at 16.

Guide plates, for guiding the match material through the said cutters are shown at 17 and 18, which plates are secured to the frame work and bearings by means of bolts and nuts 19, 20, 21 and 22.

Bearings are shown at 23 and 24, which are secured to the said frame by means of bolts and nuts 25, 26, 27 and 28.

A conveyor pulley is shown at 29, mounted on shaft 31; a conveyor belt at 30 and a feed-operating crank at 34, on the end of which is mounted said crank pin 34$^a$.

A hopper holder is shown at 35, for supporting hopper 36, and is held in place on the top of said frame by means of nuts and bolts 37 and 38 and spring 39.

Plates extend across the top of the said frame, as shown at 47 and 48, which are separated by filler plates 55 and 56. Said plates being held in place by means of nuts and studs 40, 41, 42 and 43.

A slidably mounted plate for feeding the strips of match material between the said cutters, is shown at 44, to which racks 45 and 46 are secured.

The said double crank 13 forms a casing, which is provided with pawls 49, which act in conjunction with ratchet wheel 50 for the intermittent rotation of said cutters 3 and 4.

Number 51 represents strips of match material stacked within the said hopper 36. 51$^b$, in Fig. 4, is an end view of a strip of said match material after being passed through the cutters, while 51$^b$, in Fig. 5, represents a plan view of the said strip of match material after being passed through the said cutters.

The feed mechanism crank shaft is shown at 52, the secondary drive shaft at 53 and the main drive shaft at 54.

The upper cutter 3 is provided with flanges 3$^a$ and 3$^b$, which serve to keep the said cutters 3 and 4 in their proper relative positions by preventing lateral movement while in operation.

Spring 39 is provided for each end of the holder 35 to permit the raising of said holder and the passage of material in case broken pieces get into the hopper, which might otherwise become jammed.

The operation of the match machine is as follows:

Power is applied to the rotation of shaft 54, by means of belt or gearing, which, in turn, by means of gears 15 and 14, serves to rotate shaft 53 and crank 12, which, in turn, by means of connecting rod 11, produces an oscillating movement to crank pins 9 and 13$^a$. The pin shown at 13$^a$ has a movement extending from 9 to 9$^a$. The movement of said pin 9 produces a corresponding oscillating movement to crank 34 from 34$^a$ to 34$^b$, by means of connecting rod 10.

The movement of said crank 34, by means of gears 7 and 8 and racks 45 and 46, produces a corresponding movement to the feed plate 44, which travels from 44$^a$ to 44$^b$, as shown in Fig. 3.

The said feed plate 44 is slidably mounted between guides 47 and 48, the lower guide 47 having slots in said plate to accommodate the movement of racks 45 and 46.

Plate 44, in its forward movement—extending from 44$^a$ to 44$^b$, Fig. 3, is brought in contact with the edge of the lower strip of match material 51, which is forced from its position in the hopper to position 51$^a$, which passes the material partly through the cutters 3 and 4. At this point the feed blade 44 returns to its former position, as shown at 44$^a$, when another strip of match material 51 drops into position in front of said feed blade and is likewise thrust forward into the said cutters 3 and 4.

The rotation of the lower cutter 4 is produced by means of the oscillating movement of crank 13 and the action of pawls 49 and ratchet 50, which movement is transmitted from cutter 4 to cutter 3 by means of gears 5 and 6.

Thus, it is apparent, that as crank 12 rotates on shaft 53 it produces an oscillating movement of crank 13 from 13$^a$ to 13$^b$, which, in turn, by means of pawl 49, rotates ratchet wheel 50 a portion of a revolution for each revolution of crank 12.

The said cutters 3 and 4 are provided with cutting edges for dividing the strips of match material 51—which are preferably of wood—into matches, with the exception of a narrow space along one edge of the said strip, as shown at 51$^b$, in Fig. 5, this being accomplished by means of depressions at intervals along the face of cutters 3 and 4, as shown at 3$^c$ and 4$^c$, which depressions permit the passage of said strip of match material through that portion of the said cutters without being cut and separated.

As the strips of match material are passed through the machine, between the said cutters 3 and 4 they are guided onto a conveyor belt 30 by means of guide plates 17 and 18, which are secured in position between the said cutters.

The reciprocating movement of the feed blade 44 permits a strip of match material to drop into position in front of the said feed blade at each backward stroke, and with each forward stroke of the said blade 44, a match strip is forced through the machine, between the said cutters.

Having thus described my invention, what I claim as new and desire to secure by Letters Patent is as follows:

1. A device of the character described, composed of interlocking manifold combined circular cutters and spreaders, rotatably mounted; said combined cutters and spreaders having depressions below the periphery of the cutting edges, for the passage of material over said depressions without being cut.

2. A device of the character described, consisting of duplex multiple interlocking combined circular cutters and spreaders, said cutters and spreaders having depressions at intervals across the cutting edges of said cutters and spreaders for the purpose of avoiding the cutting of material when passing between said depressions, said cutters and spreaders being provided with means for keeping the said cutters in proper alignment with each other.

3. A match machine, consisting of rotatably mounted intermittently operating manifold cutters, a reciprocatory plate for feeding the said cutters with match material, and means for operating the said cutters and feed mechanism, in timed relation to each other.

4. In a device of the character described, a frame intermittently operating manifold circular cutters rotatably mounted on said frame, a reciprocatory feed mechanism for said cutters, means for operating said cutters and feed mechanism in timed relation to each other and means for guiding material when being cut by said cutters.

5. A device of the character described, comprising a frame, manifold rotatable cutters mounted on said frame, a ratchet and pawl mechanism for intermittently rotating said cutters, a crank for operating said ratchet, means for operating said crank, a hopper for the supply of material for said cutters a reciprocating feed means for conveying said material from the said hopper to the said cutters, means for operating the said reciprocating feed means, means for rotating said manifold cutters in timed relation to the feeding mechanism and means for adjusting the relative positions of said cutters.

6. In a machine for making card matches, rotating interlocking rolls for cutting and spreading matches from already formed individual cards in a single operation, and means for intermittently feeding individual cards to said cutting and spreading rolls in timed relations to each other.

WILLIAM J. LILLY.